UNITED STATES PATENT OFFICE.

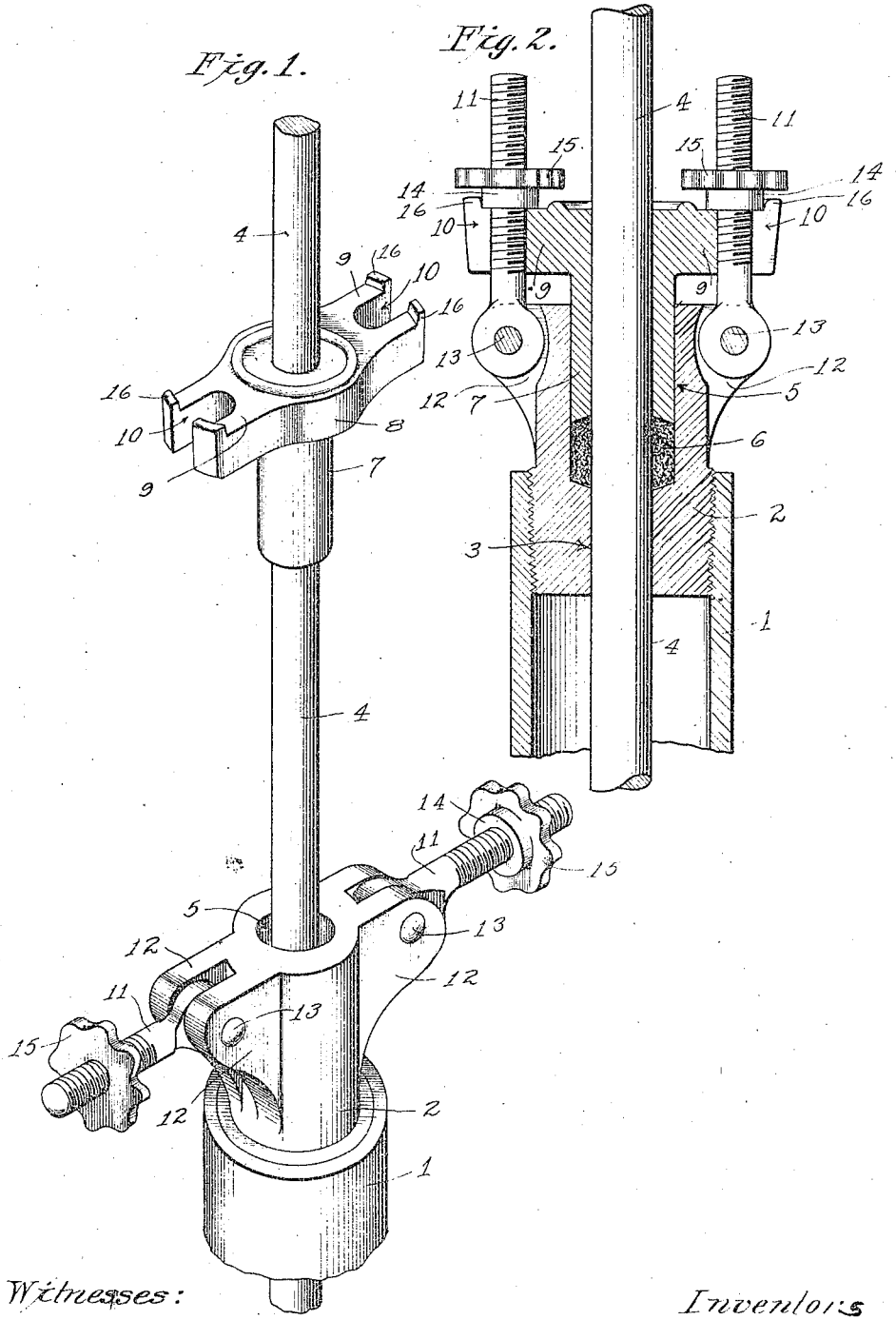

DANIEL DANIELS AND LYSLE P. BURGESS, OF LOS ANGELES, CALIFORNIA.

STUFFING-BOX FOR WORKING BARRELS OF WELL-PUMPS.

1,034,696.

Specification of Letters Patent.

Patented Aug. 6, 1912.

Application filed April 24, 1911. Serial No. 623,079.

*To all whom it may concern:*

Be it known that we, DANIEL DANIELS and LYSLE P. BURGESS, both citizens of the United States, residing at Los Angeles, in the county of Los Angeles and State of California, have invented a new and useful Stuffing-Box for Working Barrels of Well-Pumps, of which the following is a specification.

This invention relates to a stuffing box for the working barrels of well pumps, and the main object of the invention is to provide an improved construction of stuffing box which is readily accessible for inspection or renewal of the packing when necessary.

Other objects of the invention will appear hereinafter.

The accompanying drawings illustrate the invention, and referring thereto:

Figure 1 is a perspective of the stuffing box in open position. Fig. 2 is a vertical section of the stuffing box in closed position.

1 designates the internally screw-threaded upper end of a working barrel or cylinder of a well pump and 2 the externally screw-threaded upper head thereof, said head being bored as at 3 for the passage of the plunger rod or polish rod 4. Said head 2 is formed on its upper end with a recess 5 for receiving the packing indicated at 6, said packing being compressed by a gland member 7 which is bored to receive and fit on the polish rod and which slides within the recess 5 and is held down therein by a clamping means hereinafter described. The gland member is provided with a cross head or enlargement 8 at its upper end having laterally extending arms 9, said arms being provided with notches or slots 10 to receive bolts 11, said bolts being hinged or pivoted to bifurcated brackets 12 on the side of the barrel head 2 by pivot pins 13. Nuts 14 screw on the bolts 11 and are formed with peripheral portions 15 to adapt the nuts for manual operation. The arms 9 of the gland member are further provided with ledges or flanges 16 at their outer ends, serving as seating guides and retaining stops for the nuts 14 when the nuts are in clamping position.

By unscrewing the nuts and turning the clamping bolts 11 down to position shown in Fig. 1, the gland member is released and may be slid up as indicated in said figure, leaving the space or chamber 5 free or open at the top for insertion or repair of the packing. It will be noted that in this position there is no obstruction to access to the packing from all sides. The packing having been put in place, the gland member is forced down on top of the packing and the bolts 11 are then turned up so as to enter the slots 10, the nuts 14 being at this time screwed out far enough to allow them to pass over the flanges 16 on the arms 9 and when the bolts have been moved into the slots 10, the nuts 14 are screwed down tight against the top of the head of the gland member, forcing the gland member tightly against the packing and compressing the packing to tighten the stuffing box. In this position of the parts, the nuts 14 extend within the flanges 16, so that, even if the nuts become jarred loose to some extent, they are retained in engagement with the head of the movable gland member by these flanges acting as stop members to prevent the bolts from moving outward.

What we claim is:

A stuffing box for the working barrels of well pumps, comprising a barrel head formed with a recess for receiving the packing, and with bifurcated brackets, a gland member formed with a cross head having slotted arms provided with flanges serving as seating guides and retaining stops surmounting the ends of the arms, screw threaded bolts, pivot pins hinging the inner ends of the bolts to the bifurcated brackets of the barrel head, and nuts on the bolts having peripheral portions adapting the nuts for manual operation.

In testimony whereof, we have hereunto set our hands at Los Angeles, California, this 17th day of April, 1911.

DANIEL DANIELS.
LYSLE P. BURGESS.

In presence of—
ARTHUR P. KNIGHT,
FREDERICK E. LYON.